US009210727B2

(12) United States Patent
Widner (10) Patent No.: US 9,210,727 B2
(45) Date of Patent: Dec. 8, 2015

(54) WIRELESS DEVICE PAIRING

(71) Applicant: BBY SOLUTIONS, INC., Richfield, MN (US)

(72) Inventor: Steven W. Widner, Vermillion, SD (US)

(73) Assignee: BBY SOLUTIONS, INC., Richfield, MN (US)

( * ) Notice: Subject to any disclaimer, the term of this patent is extended or adjusted under 35 U.S.C. 154(b) by 65 days.

(21) Appl. No.: 14/243,243

(22) Filed: Apr. 2, 2014

(65) Prior Publication Data

US 2015/0289298 A1    Oct. 8, 2015

(51) Int. Cl.
| | |
|---|---|
| *H04W 8/00* | (2009.01) |
| *H04W 76/02* | (2009.01) |
| *H04W 4/00* | (2009.01) |
| *H04B 1/3827* | (2015.01) |
| *H04B 1/3883* | (2015.01) |

(52) U.S. Cl.
CPC ........... *H04W 76/021* (2013.01); *H04B 1/3827* (2013.01); *H04B 1/3883* (2013.01); *H04W 4/008* (2013.01)

(58) Field of Classification Search
CPC .......................... H04M 2250/02; H04W 8/005
See application file for complete search history.

(56) References Cited

U.S. PATENT DOCUMENTS

| | | | |
|---|---|---|---|
| 7,142,814 B2 | 11/2006 | Nassimi | |
| 7,236,809 B2 | 6/2007 | Fischedick et al. | |
| 7,813,715 B2 | 10/2010 | McKillop et al. | |
| 8,170,623 B2 | 5/2012 | Dorogusker et al. | |
| 8,181,233 B2 | 5/2012 | Wyld | |
| 8,364,241 B2 | 1/2013 | Hannon et al. | |
| 8,401,473 B2 | 3/2013 | Tang et al. | |
| 2004/0092249 A1* | 5/2004 | Sugikawa | 455/411 |
| 2004/0203357 A1* | 10/2004 | Nassimi | 455/41.1 |
| 2008/0057868 A1 | 3/2008 | Chang | |
| 2010/0061294 A1* | 3/2010 | Proctor et al. | 370/328 |
| 2010/0184382 A1 | 7/2010 | Inha | |
| 2012/0289159 A1* | 11/2012 | Palin et al. | 455/41.2 |
| 2013/0002192 A1 | 1/2013 | Fischbach et al. | |
| 2013/0190907 A1* | 7/2013 | Ellis et al. | 700/91 |

(Continued)

OTHER PUBLICATIONS

"Radio-frequency identification", [online]. Retrieved from the internet: <URL: http://en.wikipedia.org/wiki/Radio-frequency_identification> (2014), 1-22.

(Continued)

*Primary Examiner* — David Bilodeau
(74) *Attorney, Agent, or Firm* — Schwegman Lundberg & Woessner, P.A.

(57) ABSTRACT

Generally discussed herein are wireless systems, apparatuses, and methods for pairing a device and a base station. For example, the disclosed techniques may enable communication between a headphone base station (broadcasting an audio signal over a wireless channel) and a headphone set device (receiving an audio signal over a wireless channel) that establish communications using one or more identifiers. In some examples, a device or base station identifier maintained at the base station or device, respectfully, is validated and reprogrammed when it does not match a corresponding provided from the device or base station. In further examples, the validation and reprogramming may occur in response to a condition such as a charging event (such as the placement of the headphone set device onto a charging station provided by the headphone base station).

20 Claims, 7 Drawing Sheets

(56) References Cited

U.S. PATENT DOCUMENTS

| | | | |
|---|---|---|---|
| 2013/0237193 A1* | 9/2013 | Dumas et al. | 455/414.1 |
| 2013/0316649 A1 | 11/2013 | Newham | |
| 2014/0073252 A1* | 3/2014 | Lee et al. | 455/41.2 |

OTHER PUBLICATIONS

"Vuze™ Table Location System", © HME Wireless, Inc., (2013), 2 pgs.

* cited by examiner

WIRELESS DEVICE PAIRING

TECHNICAL FIELD

Embodiments generally relate to wireless device pairing. One or more embodiments relate to techniques for matching and updating a device identifier (ID) used among wirelessly communicating devices.

BACKGROUND

Electronic devices communicate using a variety of wired or wireless communication protocols in radio bands such as the unlicensed Industrial, Scientific, and Medical (ISM) bands. Bluetooth is one such wireless communication protocol that is deployed in a variety of consumer electronic applications. Bluetooth can be relatively expensive to implement, thus making it unattractive for some applications. In addition, Bluetooth involves a specialized device pairing scheme that is complicated to invoke by many users.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some of the embodiments described herein describe improved systems, apparatuses, and techniques for pairing or charging a wireless communications device using a base station. Some examples of devices can include headphones, a smartphone, a Personal Digital Assistant (PDA), a tablet, smart eyewear, a bracelet, or other device configured to communicate wirelessly with, or be charged by, the base station. The base station may be provided by a dedicated charging and transmission station, such as a headphone charging station, or by components and functions of electronics devices such as a home theater audio receiver, a television, a AM/FM/satellite radio, a personal media player, a media hub, a charging station, or computing devices such as a smartphone, a tablet, and the like. In such scenarios, the base station may primarily operate as the master transmitter and the device may primarily operate as the slave receiver, although it will be understood that some operations may involve the opposite or two-way communications between the units.

The following scenarios are described with specific reference to operation of a headphone set, however it will be understood that a device capable of communicating wirelessly with or being charged by the base station can be substituted for the headphones. Consider a situation in which the ability of a base station to communicate with (e.g., provide an audio broadcast to) a headphone set requires a device ID and base station ID stored in the memory of the base station to match a device ID and base station ID stored in the memory of the headphone set, respectively. In some scenarios, the memory of the base station or the headphone set may become corrupted (e.g., by being exposed to a magnetic field, power surge, heat, radiation, or other disturbance), which results in an unintended change to the device ID or the base station ID. The base station and the headphone set device would no longer be able to communicate because the device IDs or the base station IDs no longer match. To remedy such a situation, a consumer will typically return the headphone set or the base station to an originating retailer or manufacturer, to obtain a replacement or reprogrammed headphone set or base station. Embodiments discussed herein can provide the ability for the base station to reprogram the appropriate identifier, to allow communications to re-commence between the device and the base station.

Consider another situation in which two users each have wireless headphone sets that could be charged on the same base station, such as a home setting where two identical-looking headphone sets are deployed with respective base stations providing audio from different audio sources. In this setting, the user may confuse which of the two wireless headphone sets is paired to the particular base station. These two wireless headphone sets are not interchangeable with each other—because one of the headphone sets operates with a device ID that does not match the device ID stored and required by the base station, or the base station operates with a base station ID that does not match the base station ID stored and required by one of the headphone sets. Embodiments discussed herein can provide the ability for either (or both) of the base station and headphone set to reprogram the appropriate identifier(s) to allow communications with either of the multiple headphone sets, thus allowing interoperability between different devices.

Consider yet another situation in which a user has a single headphone set but multiple base stations, and each base station has a different base station ID. The single headphone set can communicate with only one of the two base stations if the base station ID that is used to communicate with the selected base station is stored in a programmable memory on the headphone set, and the device ID that is used to communicate with the headphone set is stored in a programmable memory on the base station. Embodiments discussed herein can provide the ability for the headphone set to provide its device identifier to either or both of the multiple base stations for reprogramming, allowing use of the device identifier and communications to the device from either base station. Accordingly, these techniques offer an automatic correction and matching for a variety of use cases when the device IDs or the base station IDs that are required for communication do not match.

Discussed herein are devices, base stations, and techniques that can allow for reprogramming a memory (e.g., overwriting a memory location) of the base station or the device, to enable the device ID or base station ID stored in the device memory and the base station memory to match. Such embodiments can reduce cost to the manufacturer or retailer in replacing the device or the base station. Such embodiments can also provide a user with a more seamless (e.g., less interrupted) device use experience, as the user will not have to return or repair the product in the event of device ID or base station ID corruption. Accordingly, the configurations discussed herein enable the automatic correction of many scenarios where a device ID or base station ID does not match, with this correction being performed in response to external conditions such as a charging event.

In contrast to apparatuses, systems, or techniques of the present disclosure, the device identification and communication process followed by the Bluetooth specification does not address automatic repair and correction of device connections. Bluetooth communications occur between devices which have established a "bonding" between each other, with this bond created from a pairing process that exchanges a shared secret such as a key to be stored and maintained by both devices.

A Bluetooth device (e.g., transmitter, receiver, or transceiver) has an address (e.g., a unique ID) that is programmed into a Read Only Memory (ROM), such as by a manufacturer of the Bluetooth device or the memory. A Bluetooth device can pair with another Bluetooth device (e.g., a base station) that includes an address within a specified range of addresses. Similarly, a Bluetooth base station can pair with a Bluetooth device that includes an address within a specified range of addresses. If both the Bluetooth device and Bluetooth base station have addresses that are compatible with each other, than they can pair and begin communicating. The Bluetooth pairing process generally involves user intervention and provision of the shared secret. A Bluetooth pairing, however, never alters the address or other identifier of a device or base station, as these addresses are saved in ROM. In fact, altering the address of the Bluetooth device or base station can cause it to perform improperly when the new address is different from or outside of a range of addresses that a pairable device or base station is expecting the other device or base station to have. Thus, even paired and bonded Bluetooth devices are susceptible to communication issues if a device's identifier changes or becomes corrupted.

Reference will now be made to the FIGS. to provide a more detailed discussion of example embodiments.

Figure 1:
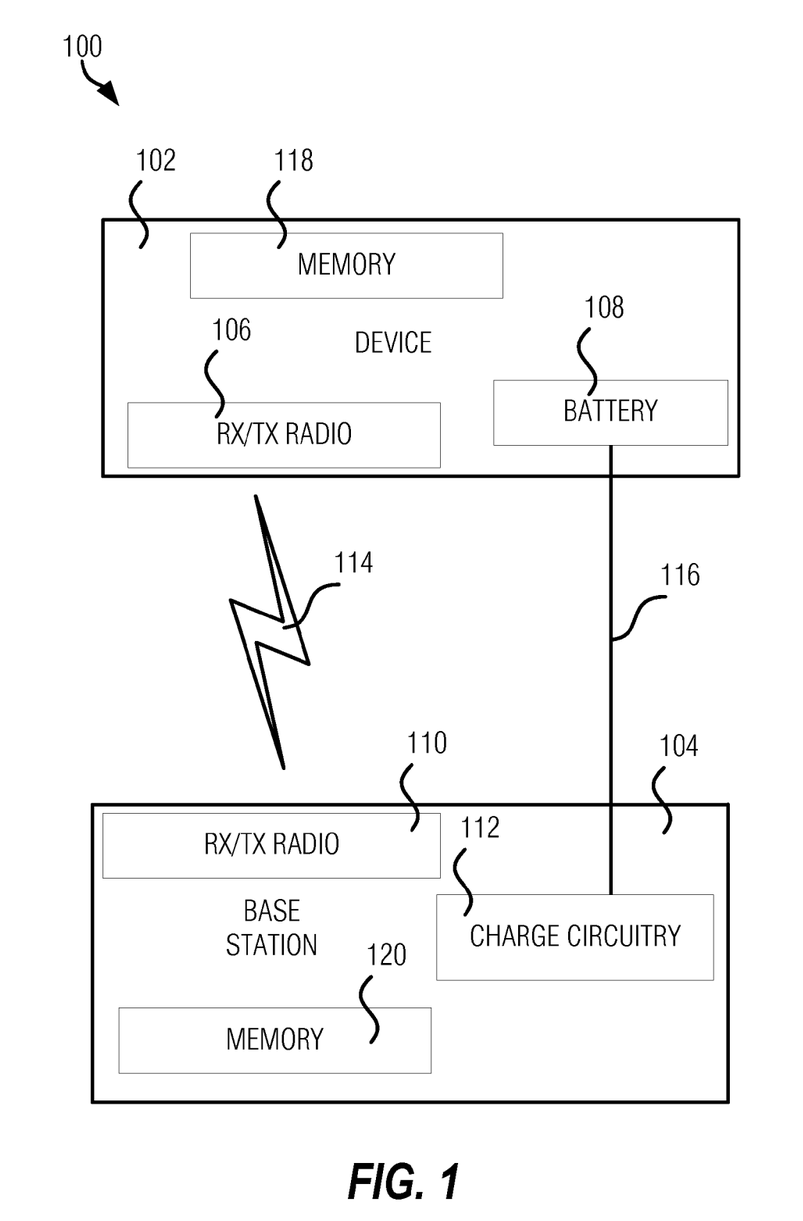
FIG. 1 illustrates a block diagram of an electronic device communication system according to one example.

FIG. 1 illustrates a block diagram of an example of a system 100. The system 100 can include a device 102 and a base station 104. The device 102 and the base station 104 can communicate wirelessly, such as by transmitting or receiving a signal 114 between a radio 106 and another radio 110. The wireless communication can be on the ISM band or another communication band. The device 102 and the base station 104 can be coupled or connected, such as to form a wired connection 116 between a battery 108 and charge circuitry 112. Communication between the device 102 and the base station 104 can occur remotely over the air whereas power transfer between the device 102 the base station 104 can occur over a physical connection or engagement.

The device 102 can include a transmit or receive radio 106 or a battery 108. A radio that can transmit and receive can be considered a transceiver. The radio 106 can include an antenna to transmit or receive a signal, such as on a specific frequency band (e.g., a 2.4 GHz band or another non-licensed ISM band). The radio 106 can be a component capable of receiving or transmitting a signal to or from the radio 110. The device 102 can include headphones, personal media player, a smartphone, a Personal Digital Assistant (PDA), a tablet, smart eyewear, a bracelet, or other portable battery-powered device configured to communicate wirelessly with and be charged by the base station 104, such as through a wired connection at a charging terminal. Note that the charging as discussed herein is generally considered a wired connection, however charging can occur wirelessly, such as by inductively charging the battery 108 with inductive charging circuitry.

The radio 106 can send control information to the base station 104. The control information can include data to cause the base station 104 to transmit a base station ID of the base station 104 to the device 102. The control information can include data indicating to the base station 104 the device ID of the device 102. The control information can include data to cause the base station 104 to add, change, or overwrite an identifier of the device (e.g., a device ID) stored in a memory 120 (e.g., non-volatile memory such as a flash memory or volatile memory such as a Random Access Memory (RAM)) of the base station 104. The base station ID or device ID may be a unique identifier structured in the format of a 12-digit hexadecimal Medium Access Control (MAC) address.

As discussed above, the device 102 can include the battery 108. The battery 108 can provide power to the device 102 and allow portability of the device within range of the base station 104. The battery 108 can be rechargeable. The battery 108 can be charged, such as by connecting the battery 108 to the charge circuitry 112 of the base station 104. As further discussed herein, various programming operations involving the control information and the exchange of identification may occur in response to charging activities that are commenced by establishing a connection between the battery 108 and the charge circuitry 112.

The base station 104 can include the transmit or receive radio 110 or the charge circuitry 112. The radio 110 can include an antenna to transmit or receive a signal. The radio 110 can be a component capable of receiving or transmitting a signal to or from the radio 106. For example, the radio 110 may be configured to provide a digital audio broadcast via signal for receipt by listening devices and radios such as the radio 106.

The radio 110 can send control information to the device 102. The control information can include data to cause the device 102 to transmit a device ID of the device 102 to the base station 104. The control information can include data indicating to the device 102 the base station ID of the base station 104. The control information can include data to cause the device 102 to add, change, or overwrite a base station ID saved in a memory 118 (e.g., non-volatile memory such as a flash memory or volatile memory such as a Random Access Memory (RAM)) of the device 102.

Figure 2:
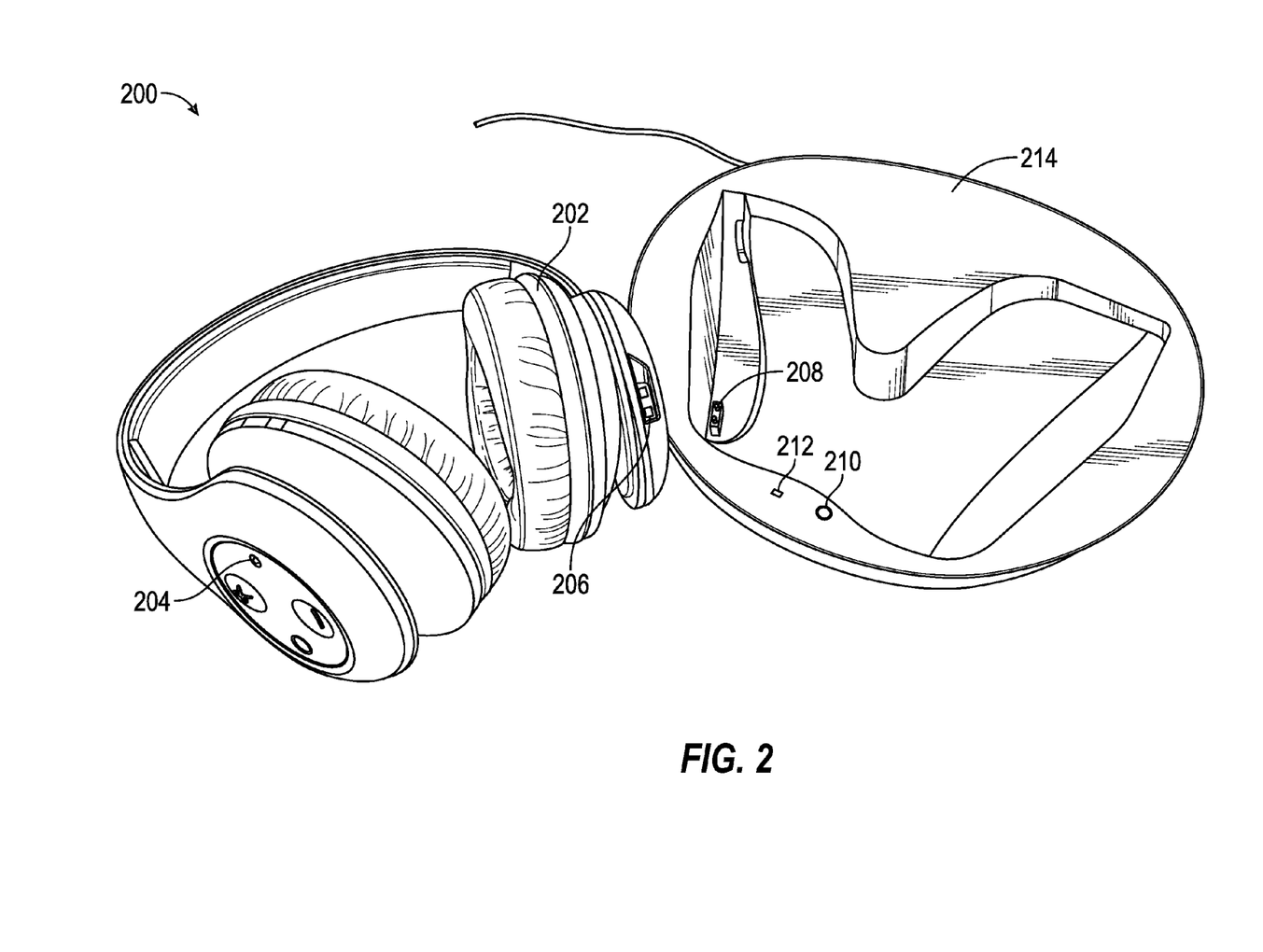
FIG. 2 illustrates components of a receiver device and a base station according to one example.

FIG. 2 illustrates a block diagram of a system 200. The system 200 can include a device 202 (e.g., a headphone set) and a base station 214 (e.g., a headphone charging and communications base). The device 202 can include items similar to the items described for device 102 and vice versa. The base station 214 can include items similar to the items described for the base station 104 and vice versa.

The device 202 can include one or more indicator lights 204. The indicator light 204 can emit pulsed or non-pulsed light. The indicator light 204 can indicate the state of the device 202. For example, when the indicator light 204 is emitting a steady light (e.g., a non-pulsed light), the indicator light 204 can be indicating that the device 202 is connected to the base station 214 or that the device 202 is turned on. When the indicator light 204 is emitting a pulsed light, it can indicate to a user that the device 202 is currently trying to establish a connection (e.g., a communication link) with the base station 214. The indicator light 204 can in some examples include an output of different colors to indicate different statuses of connection, battery charge states, error states, and the like.

The device 202 can include one more connection features 206 (e.g., male or female connection features). The connection features 206 can couple to a mating connection feature 208 of the base station 214. The connection features 206 can be electrically coupled to the battery 108 and the mating connection feature 208 can be electrically coupled to the charge circuitry 112, such that the charge circuitry 112 charges the battery 108 in response to the connection feature 206 coupling with the mating connection feature 208.

The base station 214 can include one or more indicator lights 210 or 212. The indicator light 210 or 212 can emit pulsed or non-pulsed light. The indicator light 210 or 212 can indicate a state of the base station 214. For example, when the indicator light 210 or 212 is emitting a steady light (e.g., a non-pulsed light), the indicator light 210 or 212 can be indicating that the base station 214 is communicatively coupled to the device 202, that the base station 214 is powered on, or that the charge circuitry 112 is currently charging the battery 108. When the indicator light 210 or 212 is emitting a pulsed light, it can indicate to a user that the base station 214 is currently trying to establish a connection (e.g., a communication link) with the base station 214. The indicator light 210 or 212 can in some examples include the output of different colors to indicate different statuses of connection, charging states, error states, and the like.

Figure 3A:
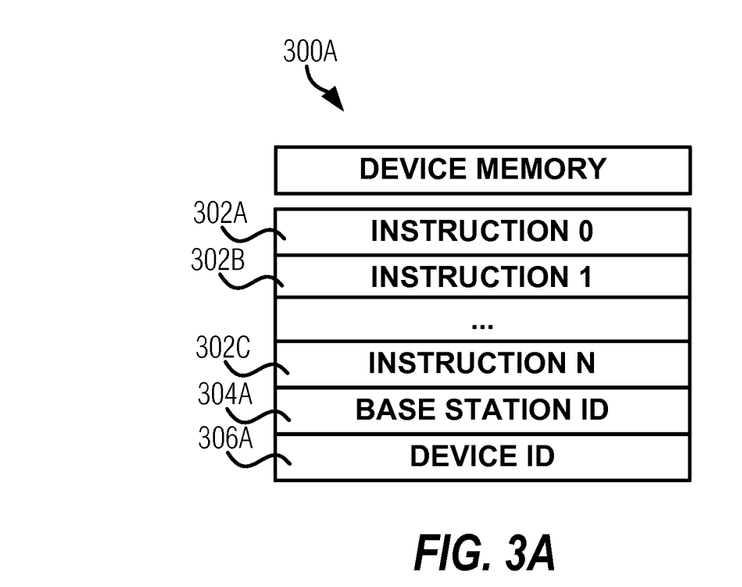
FIGS. 3A and 3B illustrate a block diagram of a device memory and a base station memory according to one example.

FIG. 3A illustrates a block diagram of a memory 300A of a device 102. The memory 300A can include one or more memory locations 302A, 302B, or 302C. The memory locations 302A, 302B, 302C can include program instructions, such as boot, configuration, or run-time instructions. The memory location can include a status indicator, or a result of a processor of the device executing an instruction. The status indicator can indicate the result of an instruction, such as whether the battery is currently being charged or is connected to the base station, a device power level, whether the device is currently paired with a base station, or the like.

The memory locations 302A, 302B, 302C can be stored in a program memory, such as a flash or RAM memory. The memory 300A can include a base station ID stored in a memory location 304A and a device ID stored in a memory location 306A. The base station ID or the device ID can be stored in a variety of non-volatile memory. The base station ID or the device ID can include a series of digits (e.g., binary, alphanumeric, or character digits). The memory location 304A can store the ID of the last base station that the device paired with or was otherwise connected to. The memory location 306A can store an ID that the device was assigned, such as by a manufacturer or a base station.

Figure 3B:
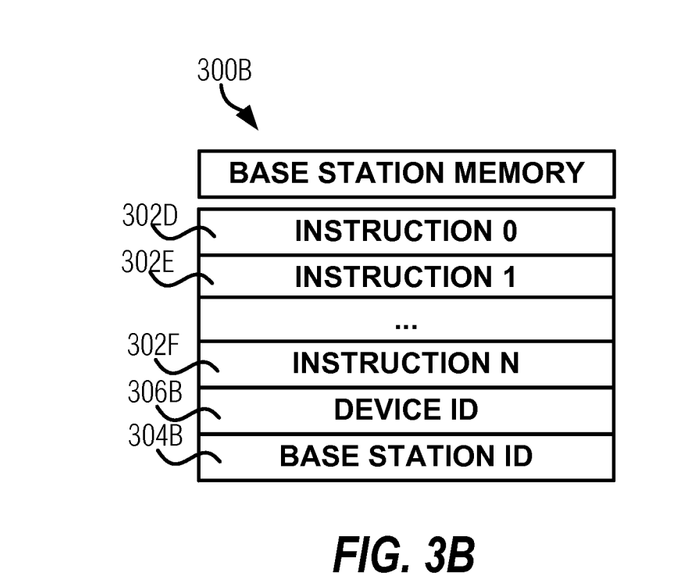

FIG. 3B illustrates a block diagram of a memory 300B of a base station 104. The memory 300B can include one or more memory locations 302D, 302E, or 302F. The memory locations 302D, 302E, 302F can include program instructions, such as boot, configuration, or run-time instructions. The memory locations 302D, 302E, 302F can include a status indicator, or a result of a processor of the base station executing an instruction. The status indicator can indicate the result of an instruction, such as whether the device is currently connected to the base station, whether the base station is currently paired with a device, a power level of a connected device, or the like.

The memory locations 302D, 302E, 302F can be stored in a program memory, such as a flash or RAM memory. The memory 300B can include a base station ID stored in a memory location 304B and a device ID stored in a memory location 306B. The base station ID or the device ID can be stored in a variety of non-volatile memory. The base station ID or the device ID can include a series of digits (e.g., binary, alphanumeric, or character digits). The memory location 306B can include the ID of the last device that the base station paired with or was otherwise connected to. The memory location 304B can include the ID of the last ID that the base station was assigned, such as by a device or manufacturer.

Storage of the device and base station identifiers at both the device memory 300A and the base station memory 300B provides a redundant mechanism to allow recovery of communications upon a memory corruption event (or another event resulting in the identifiers not matching). Thus, if one party's memory becomes corrupted, there is a backup copy at the other party that is utilized to restore (or re-establish) the device's (or the base station's) identity.

A communication between the device 102 and the base station 104 can include communicating the base station ID from memory location 304A, 304B or the device ID from memory location 306A, 306B to the base station 104 or the device 102. The memory location 302A, 302B, 302C, 302D, 302E, 302F can include an instruction for determining that the device 102 is connected to the base station 104 before communicating the base station ID 304A/304B or the device ID 306A/306B. In response to determining that the base station ID in memory location 304A or the device ID in memory location 306A matches the base station ID in memory location 304B or the device ID in memory location 306B, respectively (e.g., the device 102 and the base station 104 are correctly paired to one another), the device 102 and the base station 104 can proceed with normal operation, such as by transmitting data (e.g., non-control information data such as audio signals) to the device 102.

In response to determining that base station ID in memory location 304A or the device ID in memory location 306A does not match the base station ID in memory location 304B or the device ID in memory location 306B, respectfully, a reprogramming technique may be performed to replace and correct the identifier that does not match. For example, device 102 can overwrite the base station ID in memory location 304A or the device ID in memory location 306A, or the base station 104 can overwrite the base station ID in memory location 304B or the device ID in memory location 306B. As a result of this reprogramming technique, the device ID 304A is adapted to match the device ID in memory location 304B or the base station ID in memory location 306A is adapted to match the base station ID in memory location 306B.

The memory locations 302A, 302B, 302C, 302D, 302E, 302F can be configured to provide instructions for the reprogramming technique, or otherwise cause the device 102 or the base station 104 to perform the operations as discussed. These operations may be performed in response to the device 102 or the base station 104 executing the instructions 302A, 302B, 302C, 302D, 302E, 302F. The instructions 302A, 302B, 302C, 302D, 302E, 302F may be triggered, for example, in response to an instruction (or instruction result) which detects an active charging state between the device 102 and the base station 104, and which detects a discrepancy between an identifier used in the device 102 or the base station 104. In some examples, this check may be performed to detect whether the identifiers between the base station 104 and device 102 match; in other examples, a reprogramming of any overwritable identifiers is conducted every time that an active charging state is first detected.

Figure 4:
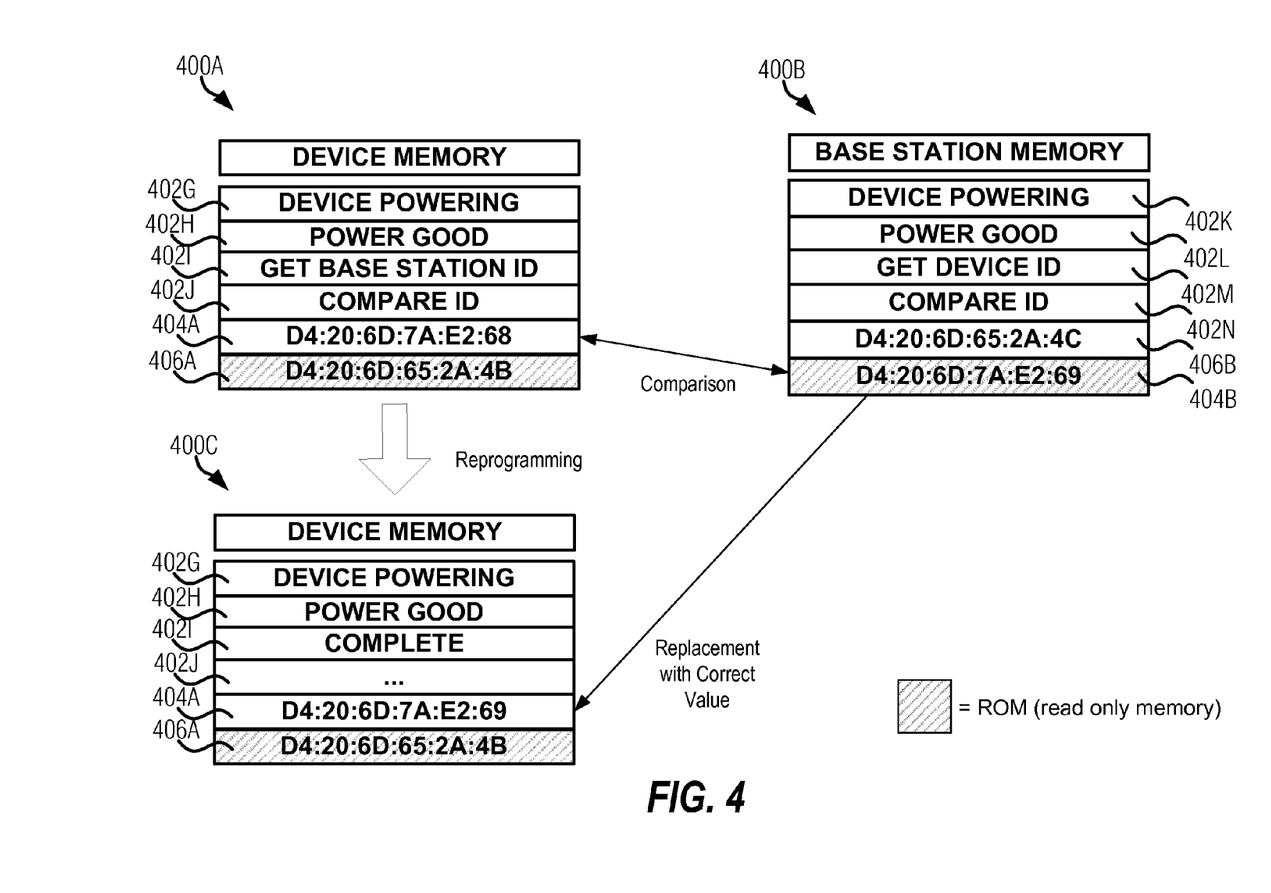
FIG. 4 illustrates a block diagram of a device memory and a base station memory in response to causing a base station ID to match another instance of the base station ID according to one example.

FIG. 4 illustrates a block diagram of device memory states 400A, 400C and a base station memory state 400B before and after reprogramming the device memory. This reprogramming operation is shown as reprogramming the device memory to ensure that a device ID or a base station ID in the device memory matches a device ID or a base station ID of the base station memory. The device memory 400A can include status indicators in memory locations 402G and 402H and instructions in memory locations 402I and 402J. The base station memory 400B, for example, can include status indicators in memory location 402K and 402L and instructions in memory locations 402M and 402N. The shading of memory locations 406A, 404B in FIG. 4 indicates a memory location that is provided in read only memory (ROM) that is factory programmed, whereas other memory locations may be provided from storage memory (e.g., flash memory for memory locations 404A, 406B) and volatile memory (e.g., RAM for memory locations 402G, 402H, 402I, 402J, 402K, 402L, 402M, 402N). Thus, the device identifier and base station identifier provided from the storage memory may be initially factory programmed but are subject to overwriting and replacement.

The instructions in memory locations 402I, 402J, 402M, and 402N can cause the device or base station to compare base station IDs or device IDs. This check may occur in response to some condition, such as the detection of the commencement for a charging process. In the example of FIG. 4, the base station ID from memory location 404A (in the device memory) will be determined to not match the base station ID from memory location 404B (in the base station memory). Accordingly, the base station will be unable to properly communicate or perform other functions with the device with the mismatched identifiers.

In response to the condition, the reprogramming operation will rewrite the storage memory at the device memory 400A. The device memory 400C shows the state of the device memory 400A after the base station ID in memory location 404A is reprogrammed or overwritten with the correct base station ID existing in the memory location 404B of the base station memory 400B. After reprogramming, the device memory 400C reflects that the value of the memory location 404A at the device matches the value of the memory location 404B at the base station.

In other examples, (not depicted in FIG. 4), the device ID at memory location 406A (at the device) may not match the device ID at memory location 406B (at the base station). In such cases, the device memory at the base station may be reprogrammed or overwritten with the correct device ID existing in the memory location 406A of the device memory 400B. In still other examples, both the device identifier and the base station identifier may be programmed at the base station and the device, respectfully. (For example, both identifiers may need to be reprogrammed when a headphone set is placed in proximity to a new (and un-paired) base station).

Figure 5:
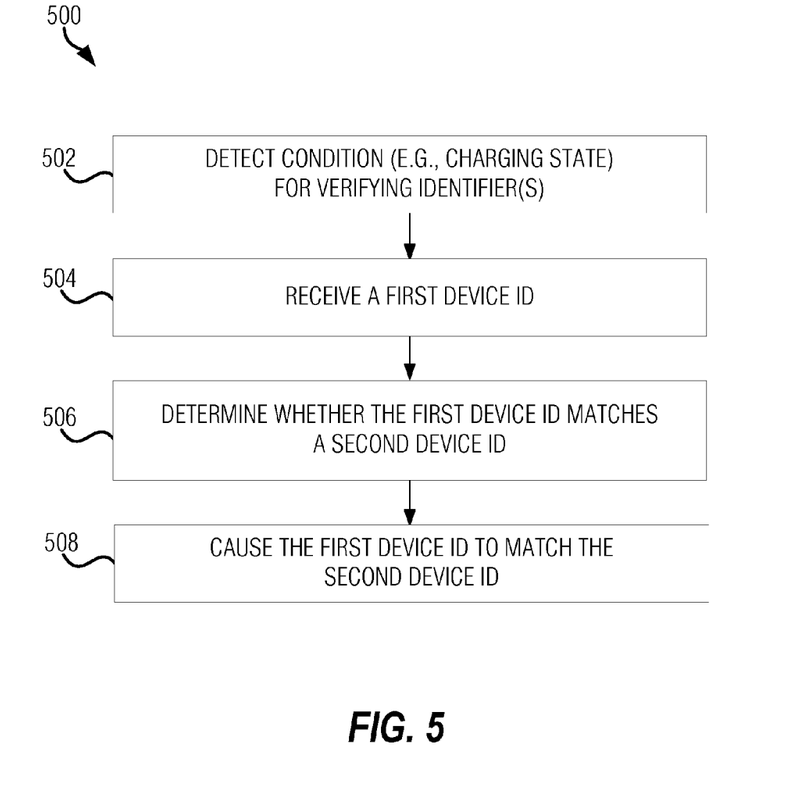
FIG. 5 illustrates a flow diagram of a technique for reprogramming a device identifier according to one example.

FIG. 5 shows a flow diagram of an example of a technique 500 for reprogramming a device identifier. At 502, the technique commences when a particular condition for verifying and reprogramming the device identifier is detected or otherwise satisfied. For example, the condition may be triggered in response to the detection of a charging event at the device from a connection to a charging component of the base station. At 504 a first device ID can be received. The first device ID can be stored in a device memory or a base station memory. The first device ID can be received over a wireless connection between the device and base station, such as at the device or the base station. At 506, it can be determined (e.g., using a processor of the device or base station) whether the first device ID matches a second device ID. The second device ID can be stored in the device memory or the base station memory.

At 508, the first device ID can be caused to match the second device ID. The first device ID can be caused to match the second device ID in response to determining that the first device ID does not match the second device ID. The first device ID can be caused to match the second device ID by reprogramming or overwriting a memory location of the device memory or the base station memory that includes the first or second device ID. In further examples, the first device ID can be caused to match the second device ID by sending a command to the base station or the device (e.g., over the wireless connection) that causes the base station or device to overwrite the first device ID with the second device ID or the second device ID with the first device ID.

Figure 6:
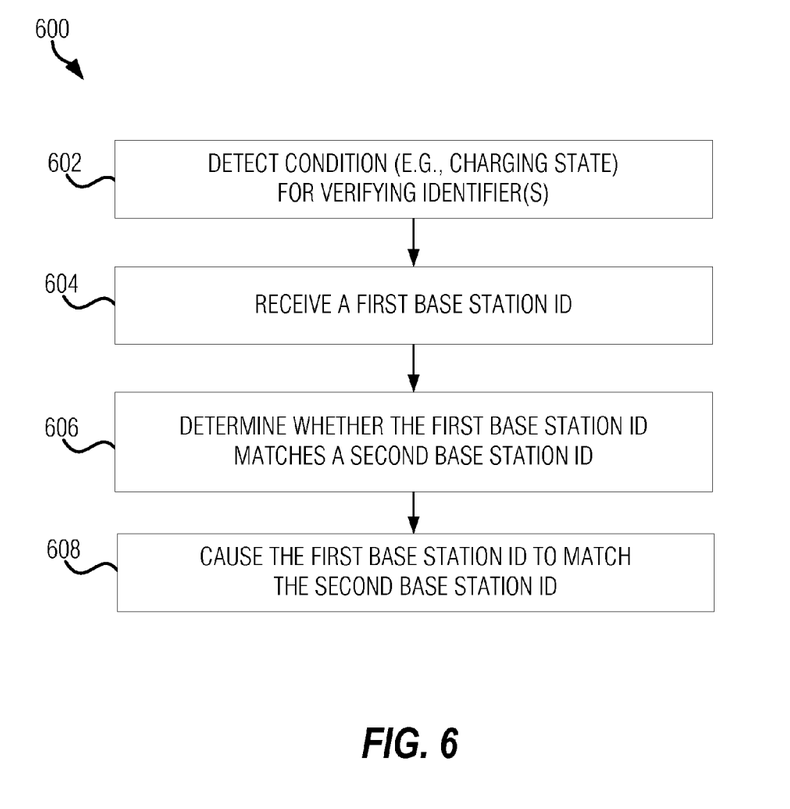
FIG. 6 illustrates a flow diagram of a technique for reprogramming a base station identifier according to one example.

FIG. 6 shows a flow diagram of an example of a technique 600 for reprogramming a base station identifier. An operation of the technique 600 can be combined with (or substituted for) operation of the technique 500 and vice versa. At 602, the technique commences when a particular condition for verifying and reprogramming the base station identifier is detected or otherwise satisfied. For example, the condition may be triggered in response to the detection of a charging event with a chargeable component of the device. At 604 a first base station ID can be received. The first base station ID can be stored in a device memory or a base station memory. The first base station ID can be received over a wireless connection between the device and base station, such as at the device or the base station. At 606, it can be determined (e.g., using a processor of the device or base station) whether the first base station ID matches a second base station ID. The second base station ID can be stored in the device memory or the base station memory.

At 608, the first base station ID can be caused to match the second base station ID. The first base station ID can be caused to match the second base station ID in response to determining that the first base station ID does not match the second base station ID. The first device ID can be caused to match the second device ID by reprogramming or overwriting a memory location of the device memory or the base station memory that includes the first or second device ID. In further examples, the first base station ID can be caused to match the second base station ID by or sending a command to the base station or the device (e.g., over the wireless connection) that causes the base station or device to overwrite the first device ID with the second device ID or the second device ID with the first device ID.

Further operations for the techniques 500, 600 can also include determining whether the base station is electrically connected to the device through a female or male connection feature of the base station or a mating male or female connection feature of the device, such as determining whether charging has commenced before checking the device identifiers and causing the first device ID to match the second device ID. The techniques 500, 600 can also include charging a battery of the device using charging circuitry of the base station, such as in response to determining the base station is electrically connected to the device. The techniques 500, 600 can also include changing a state of an indicator light of the base station in response to determining the first device ID matches the second device ID or determining the first base station ID matches the second base station ID.

Although the previous examples were provided with reference to communications established between a portable device and a base station (such as headphones and a charging/transmitting station), it will be understood that the reprogramming techniques described herein are applicable to a wide variety of device communication settings. These may include any number of settings where devices attempt to communicate wirelessly with one another over a wireless network (including over Wi-Fi and Bluetooth networks, other Wireless Local Area Network/Wireless Personal Area Network configurations, and other RF communication links).

In still further configurations, the communication techniques described herein may be used in connection with automatic synchronization or pairing between content output devices such as televisions or A/V receivers, and content sources such as media sticks (e.g., Chromecast or Roku sticks), DVD/Blu-ray players, video game consoles, and the like. The communication technique may also be applied for automatic sync techniques for devices such as cameras, printers, or other peripherals which establish a connection to a computing device. The techniques described herein may also be applied in connection with near-field communication (NFC) applications (including communications between devices having identifiers provided by RFID tags).

Figure 7:
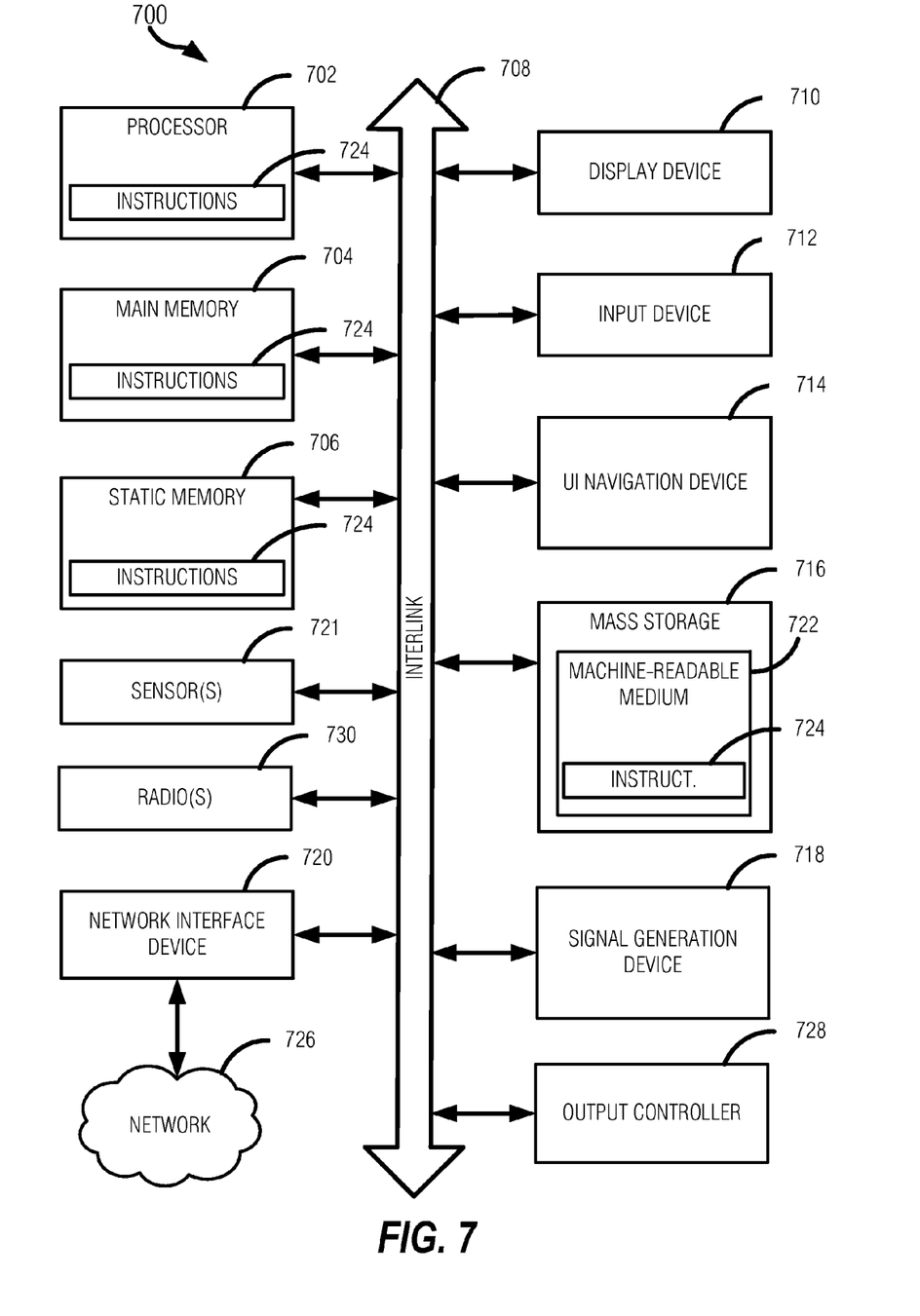
FIG. 7 illustrates a block diagram of a wireless communications apparatus according to one example.

FIG. 7 illustrates a block diagram of an example of a wired or wireless device 700 operating in accord with one or more embodiments. The device 700 (e.g., a machine) can operate so as to perform one or more of the programming or communication techniques (e.g., methodologies) discussed herein. In some examples, the device 700 may operate as a standalone device or may be connected (e.g., networked) to other machines, such as the device 102 or the base station 104. In other examples, the device 700 can be a part of the device 102 or the base station 104, as discussed herein.

Embodiments, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Device (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The device 700 may further include a display unit 710, an input device 712 (e.g., an alphanumeric keyboard), and a user interface (UI) navigation device 714 (e.g., a mouse). In an example, the display unit 710, input device 712 and UI navigation device 714 may be a touch screen display. The device 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The device 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). The device 700 may include one or more radios 730 (e.g., transmission, reception, or transceiver devices). The radios 730 can include one or more antennas to receive signal transmissions. The radios 730 can be coupled to or include the processor 702. The processor 702 can cause the radios 730 to perform one or more transmit or receive operations. Coupling the radios 730 to such a processor can be considered configuring the radio 730 to perform such operations.

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the device 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724. The term "machine readable medium" may include any tangible medium that is capable of storing, encoding, or carrying instructions for execution by the device 700 and that cause the device 700 to perform any one or more of the techniques of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the device 700, and includes digital or analog communications signals or other intangible medium to facilitate communication of such software.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure. The following examples are provided with reference to device-side and base station-side operations, but it will be understood that in some examples, a combination of device-side and base station-side operations may occur.

Base station example 1 includes subject matter (embodied for example by an apparatus, machine, or machine-readable medium) of a base station including: a radio receiver adapted to receive a first device identifier (ID) transmitted from a radio transmitter of a device; a radio transmitter adapted to transmit communications to a radio receiver of the device, wherein the communications to the radio receiver of the device utilize a device ID value; a memory including a second device ID; and a device ID reprogramming module adapted to: in response to detecting a condition for verifying the second device ID, determine whether the first device ID received from the device matches the second device ID stored in the memory; and in response to determining the first device ID received from the device does not match the second device ID stored in the memory, cause the second device ID in the memory to be reprogrammed with the first device ID, resulting in subsequent communications to the radio receiver of the device to utilize the first device ID as the device ID value.

In base station example 2, the subject matter of base station example 1 may include a charging connection feature and charge circuitry, the charge circuitry adapted to charge a battery of the device in response to the charging connection feature of the base station establishing a charging connection with the device.

In base station example 3, the subject matter of any one or more of base station examples 1 to 2 may include the condition for verifying the second device ID occurring in response to the charging connection feature of the base station establishing a charging connection with the device.

In base station example 4, the subject matter of any one or more of base station examples 1 to 3 may include the radio receiver being further adapted to receive a first base station identifier (ID) transmitted from the radio transmitter of the device, wherein the memory of the base station stores a second base station ID; with the base station further comprising a base station ID reprogramming module adapted to: in response to detecting a condition for verifying the first base station ID, determine whether the first base station ID received from the device matches the second base station ID stored in the memory of the base station; and in response to determining the first base station ID received from the device does not match the second base station ID stored in the memory of the base station, cause the device to be reprogrammed with the second base station ID.

In base station example 5, the subject matter of any one or more of base station examples 1 to 4 may include the second device ID being stored in a programmable non-volatile memory of the base station, wherein the first base station ID is stored in a programmable non-volatile memory of the device.

In base station example 6, the subject matter of any one or more of base station examples 1 to 5 may include the first device ID being stored in a pre-programmed read-only memory (ROM) of the device, wherein the second base station ID is stored in a pre-programmed read-only memory (ROM) of the base station.

In base station example 7, the subject matter of any one or more of base station examples 1 to 6 may include an indicator light, the indicator light adapted to change state in response to determining that the first device ID matches the second device ID.

In base station example 8, the subject matter of any one or more of base station examples 1 to 7 may include the first device ID received from the device including a 12-digit hexadecimal Medium Access Control (MAC) address.

In base station example 9, the subject matter of any one or more of base station examples 1 to 8 may include the radio receiver and the radio transmitter being adapted to communicate using a frequency in an Industrial, Scientific, and Medical (ISM) radio band.

In base station example 10, the subject matter of any one or more of base station examples 1 to 9 may include the base station being a headphone audio transmitter configured to wirelessly transmit a digital audio signal to the device, and wherein the device is a battery-powered headphone set including speakers adapted to generate output of the digital audio signal, the digital audio signal communicated to the device with use of the first device ID.

Base station example 11 includes, or may optionally be combined with all or portions of the subject matter of one or any combination of base station examples 1 to 10, to embody subject matter (e.g., a method, machine readable medium, or operations arranged or configured from an apparatus or machine) with operations performed by a processor or other hardware elements, the operations including: receiving, at a base station and from a device via a wireless communication, a first device identifier (ID) stored in a memory of the device; detecting, using a processor, a condition for verifying the first device ID received from the device; determining, using the processor, whether the first device ID received from the device matches a second device ID stored in a memory of the base station; and in response to determining that the first device ID received from the device does not match the second device ID stored in the base station, causing a memory location in the memory of the base station to be reprogrammed with the first device ID received from the device.

In base station example 12, the subject matter of base station example 11 may include determining that the base station is electrically connected to the device through a charging connection feature of the base station before causing the memory location to be reprogrammed.

In base station example 13, the subject matter of any one or more of base station examples 11 to 12 may include charging a battery of the device using charging circuitry of the base station in response to determining the charging connection feature is electrically connected to the device.

In base station example 14, the subject matter of any one or more of base station examples 11 to 13 may include receiving, with a second wireless communication at the base station and from the device, a first base station ID stored in the memory of the device; determining, using the processor, whether the first base station ID matches a second base station ID stored in the memory of the base station; and in response to determining the first base station ID received from the device does not match the second base station ID stored in the memory of the base station, causing a memory location in the memory of the device to be reprogrammed with the second base station ID.

In base station example 15, the subject matter of any one or more of base station examples 11 to 14 may include a scenario where the memory location of the base station is maintained in a programmable non-volatile memory within the base station, and where the memory location of the device is maintained in a programmable non-volatile memory within the device.

In base station example 16, the subject matter of any one or more of base station examples 11 to 15 may include changing a state of an indicator light of the base station in response to determining the first device ID matches the second device ID and determining the first base station ID matches the second base station ID.

In base station example 17, the subject matter of any one or more of base station examples 11 to 16 may include the memory of the base station including the second device ID stored thereon at the memory location and wherein causing the memory location of the base station to be reprogrammed includes replacing the second device ID with a value from the first device ID at the memory location.

Base station example 18 includes, or may optionally be combined with all or portions of the subject matter of one or any combination of base station examples 1 to 17, to embody subject matter (e.g., a method, machine readable medium, or operations arranged or configured from an apparatus or machine) of instructions for causing a base station machine to perform operations comprising: processing, from a wireless connection with a device, a received first device identifier (ID), the first device ID originating from a memory of the device; detecting a condition for verifying the first device ID; determining whether the first device ID matches a second device ID stored in a memory of the base station machine; and in response to determining that the first device ID does not match the second device ID, causing a memory location in the memory of the base station machine to be reprogrammed to a value of the first device ID.

In base station example 19, the subject matter of base station example 18 may include receiving, over the wireless connection at the base station machine and from the device, a first base station ID stored in the memory of the device; determining whether the first base station ID received from the device matches a second base station ID stored in the memory of the base station machine; and in response to determining that the first base station ID received from the device does not match the second base station ID stored in the memory of the base station machine, causing a memory location in the memory of the device to be reprogrammed to a value of the second base station ID.

In base station example 20, the subject matter of any one or more of base station examples 18 to 19 may include determining that the base station machine is electrically connected to the device through a charging connection feature of the base station machine before causing the memory location of the base station machine to be reprogrammed or causing the memory location of the device to be reprogrammed.

Device example 1 includes subject matter (embodied for example by an apparatus, machine, or machine-readable medium) of a device including: a radio receiver adapted to receive a first base station identification (ID) and communications transmitted from a radio transmitter of a base station, wherein the communications to the radio receiver utilize a base station ID value; a memory including a second base station ID stored thereon; and a base station ID reprogramming module adapted to: in response to detecting a condition for verifying the second base station ID, determine whether the first base station ID received from the base station matches the second base station ID stored in the memory; and in response to determining the first base station ID received from the base station does not match the second base station ID stored in the memory, cause a memory location of the device to be reprogrammed such that the first base station ID matches the second base station ID.

In device example 2, the subject matter of device example 1 may include the second base station ID stored on the memory at a first memory location, wherein the base station ID reprogramming module is further adapted to cause the first memory location to be overwritten by storing the first base station ID in the first memory location.

In device example 3, the subject matter of any one or more of device examples 1 to 2 may include the radio receiver further adapted to receive a first device ID from the base station, wherein the memory of the device further includes a second device ID stored thereon; the device further comprising a device ID reprogramming module adapted to: in response to detecting a condition for verifying the first device ID, determine whether the first device ID received from the base station matches the second device ID stored in the memory of the device; and in response to determining the first device ID received from the base station does not match the second device ID stored in the memory of the device, cause the base station to be reprogrammed with the second device ID.

In device example 4, the subject matter of any one or more of device examples 1 to 3 may include the second base station ID stored in a programmable non-volatile memory of the device, wherein the first device ID is stored in a programmable non-volatile memory of the base station.

In device example 5, the subject matter of any one or more of device examples 1 to 4 may include the second device ID stored in a pre-programmed read-only memory (ROM) of the device, wherein the first base station ID is stored in a pre-programmed read-only memory (ROM) of the base station.

In device example 6, the subject matter of any one or more of device examples 1 to 5 may include the first device ID, second device ID, first base station ID, or second base station ID being a 12-digit hexadecimal Medium Access Control (MAC) address.

In device example 7, the subject matter of any one or more of device examples 1 to 6 may include an indicator light to change state in response to determining the first device ID matches the second device ID and determining the first base station ID matches the second base station ID.

In device example 8, the subject matter of any one or more of device examples 1 to 7 may include a battery adapted to receive a charge from charging circuitry of the base station in response to the device being coupled to the base station through a charging connection feature.

In device example 9, the subject matter of any one or more of device examples 1 to 8 may include the condition for verifying the second base station ID occurring in response to the charging connection feature of the device establishing a charging connection with the base station.

In device example 10, the subject matter of any one or more of device examples 1 to 9 may include the radio receiver being adapted to conduct communications with the base station using a frequency in an Industrial, Scientific, and Medical (ISM) radio band.

Device example 11 includes, or may optionally be combined with all or portions of the subject matter of one or any combination of device examples 1 to 10, to embody subject matter (e.g., a method, machine readable medium, or operations arranged or configured from an apparatus or machine) with operations performed by a processor or other hardware elements, the operations including: receiving, at a device and from a base station over a wireless connection, a first base station identification (ID) stored in a memory of the base station; determining, using a processor, whether the first base station ID matches a second base station ID stored in a memory of the device; and in response to determining the first base station ID does not match the second base station ID, causing a memory location in the memory of the device to be reprogrammed with the first base station ID received from the base station.

In device example 12, the subject matter of device example 11 may include determining that the device is electrically connected to the base station through a charging connection feature of the device before causing the memory location to be reprogrammed.

In device example 13, the subject matter of any one or more of device examples 11 to 12 may include receiving, over the wireless connection at the device and from the base station, a first device ID stored in the memory of the base station; determining, using the processor, whether the first device ID matches a second device ID stored in the memory of the device; and in response to determining the first device ID received from the base station does not match the second device ID stored in the memory of the device, causing a memory location in the memory of the base station to be reprogrammed with the second device ID.

In device example 14, the subject matter of any one or more of device examples 11 to 13 may include the memory location of the base station being maintained in a programmable non-volatile memory within the base station, and wherein the memory location of the device is maintained in a programmable non-volatile memory within the device.

In device example 15, the subject matter of any one or more of device examples 11 to 14 may include changing a state of an indicator light of the device in response to determining the first device ID matches the second device ID and determining the first base station ID matches the second base station ID.

In device example 16, the subject matter of any one or more of device examples 11 to 15 may include the memory of the device including the second base station ID stored thereon at the memory location wherein causing the memory location of the device to be reprogrammed includes replacing the second base station ID with a value from the first base station ID at the memory location.

Device example 17 includes, or may optionally be combined with all or portions of the subject matter of one or any combination of device examples 1 to 16, to embody subject matter (e.g., a method, machine readable medium, or operations arranged or configured from an apparatus or machine) of instructions for causing a device machine to perform operations comprising: processing, from a wireless connection with a base station, a received first base station identification (ID), the first base station ID originating in a memory of the base station; detecting a condition for verifying the first base station ID; determining whether the first base station ID matches a second base station ID stored in a memory of the device machine; and in response to determining the first base station ID does not match the second base station ID, causing a memory location in the memory of the device machine to be reprogrammed to a value of the first base station ID.

In device example 18, the subject matter of base station example 17 may include receiving, over the wireless connection at the device machine and from the base station, a first device ID stored in the memory of the base station; determining whether the first device ID received from the base station matches a second device ID stored in the memory of the device machine; and in response to determining that the first device ID received from the base station does not match the second device ID stored in the memory of the device machine, causing a memory location in the memory of the base station to be reprogrammed to a value of the second device ID.

In device example 19, the subject matter of any one or more of base station examples 18 to 19 may include determining that the device machine is electrically connected to the base station through a charging connection feature of the device machine before causing the memory location of the device machine to be reprogrammed or causing the memory location of the base station to be reprogrammed.

The above detailed description includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A base station comprising:
   a radio receiver adapted to receive a first device identifier (ID) transmitted from a radio transmitter of a device;
   a radio transmitter adapted to transmit communications to a radio receiver of the device, wherein the communications to the radio receiver of the device utilize a device ID value;
   a memory including a second device ID; and
   a device ID reprogramming module adapted to:
      in response to detecting a condition for verifying the second device ID, determine whether the first device ID received from the device matches the second device ID stored in the memory; and
      in response to determining the first device ID received from the device does not match the second device ID stored in the memory, cause the second device ID in the memory to be reprogrammed with the first device ID, resulting in subsequent communications to the radio receiver of the device to utilize the first device ID as the device ID value.

2. The base station of claim 1, further comprising a charging connection feature and charge circuitry, the charge circuitry adapted to charge a battery of the device in response to the charging connection feature of the base station establishing a charging connection with the device.

3. The base station of claim 2, wherein the condition for verifying the second device ID occurs in response to the charging connection feature of the base station establishing a charging connection with the device.

4. The base station of claim 1, wherein the radio receiver is further adapted to receive a first base station identifier (ID) transmitted from the radio transmitter of the device, and wherein the memory of the base station stores a second base station ID;
   the base station further comprising a base station ID reprogramming module adapted to:
      in response to detecting a condition for verifying the first base station ID, determine whether the first base station ID received from the device matches the second base station ID stored in the memory of the base station; and
      in response to determining the first base station ID received from the device does not match the second base station ID stored in the memory of the base station, cause the device to be reprogrammed with the second base station ID.

5. The base station of claim 4, wherein the second device ID is stored in a programmable non-volatile memory of the base station, and wherein the first base station ID is stored in a programmable non-volatile memory of the device.

6. The base station of claim 5, wherein the first device ID is stored in a pre-programmed read-only memory (ROM) of the device, and wherein the second base station ID is stored in a pre-programmed read-only memory (ROM) of the base station.

7. The base station of claim 1, further comprising an indicator light, the indicator light adapted to change state in response to determining that the first device ID matches the second device ID.

8. The base station of claim 1, wherein the first device ID received from the device includes a 12-digit hexadecimal Medium Access Control (MAC) address.

9. The base station of claim 1, wherein the radio receiver and the radio transmitter are adapted to communicate using a frequency in an Industrial, Scientific, and Medical (ISM) radio band.

10. The base station of claim 1, wherein the base station is a headphone audio transmitter configured to wirelessly transmit a digital audio signal to the device, and wherein the device is a battery-powered headphone set including speakers adapted to generate output of the digital audio signal, the digital audio signal communicated to the device with use of the first device ID.

11. A method comprising:
receiving, at a base station and from a device via a wireless communication, a first device identifier (ID) stored in a memory of the device;
detecting, using a processor, a condition for verifying the first device ID received from the device;
determining, using the processor, whether the first device ID received from the device matches a second device ID stored in a memory of the base station; and
in response to determining that the first device ID received from the device does not match the second device ID stored in the base station, causing a memory location in the memory of the base station to be reprogrammed with the first device ID received from the device.

12. The method of claim 11, further comprising determining that the base station is electrically connected to the device through a charging connection feature of the base station before causing the memory location to be reprogrammed.

13. The method of claim 12, further comprising charging a battery of the device using charging circuitry of the base station in response to determining the charging connection feature is electrically connected to the device.

14. The method of claim 11, further comprising:
receiving, with a second wireless communication at the base station and from the device, a first base station ID stored in the memory of the device;
determining, using the processor, whether the first base station ID matches a second base station ID stored in the memory of the base station; and
in response to determining the first base station ID received from the device does not match the second base station ID stored in the memory of the base station, causing a memory location in the memory of the device to be reprogrammed with the second base station ID.

15. The method of claim 14, wherein the memory location of the base station is maintained in a programmable non-volatile memory within the base station, and wherein the memory location of the device is maintained in a programmable non-volatile memory within the device.

16. The method of claim 14, further comprising changing a state of an indicator light of the base station in response to determining the first device ID matches the second device ID and determining the first base station ID matches the second base station ID.

17. The method of claim 11, wherein the memory of the base station includes the second device ID stored thereon at the memory location and wherein causing the memory location of the base station to be reprogrammed includes replacing the second device ID with a value from the first device ID at the memory location.

18. A non-transitory machine readable storage medium comprising instructions stored thereon, the instructions, which when executed by a base station machine, cause the base station machine to perform operations comprising:
processing, from a wireless connection with a device, a received first device identifier (ID), the first device ID originating from a memory of the device;
detecting a condition for verifying the first device ID;
determining whether the first device ID matches a second device ID stored in a memory of the base station machine; and
in response to determining that the first device ID does not match the second device ID, causing a memory location in the memory of the base station machine to be reprogrammed to a value of the first device ID.

19. The machine readable storage medium of claim 18, wherein the instructions further cause the base station machine to perform operations comprising:
receiving, over the wireless connection at the base station machine and from the device, a first base station ID stored in the memory of the device;
determining whether the first base station ID received from the device matches a second base station ID stored in the memory of the base station machine; and
in response to determining that the first base station ID received from the device does not match the second base station ID stored in the memory of the base station machine, causing a memory location in the memory of the device to be reprogrammed to a value of the second base station ID.

20. The machine readable storage medium of claim 19, wherein the instructions further cause the base station machine to perform operations comprising:
determining that the base station machine is electrically connected to the device through a charging connection feature of the base station machine before causing the memory location of the base station machine to be reprogrammed or causing the memory location of the device to be reprogrammed.

* * * * *